Figure 1:
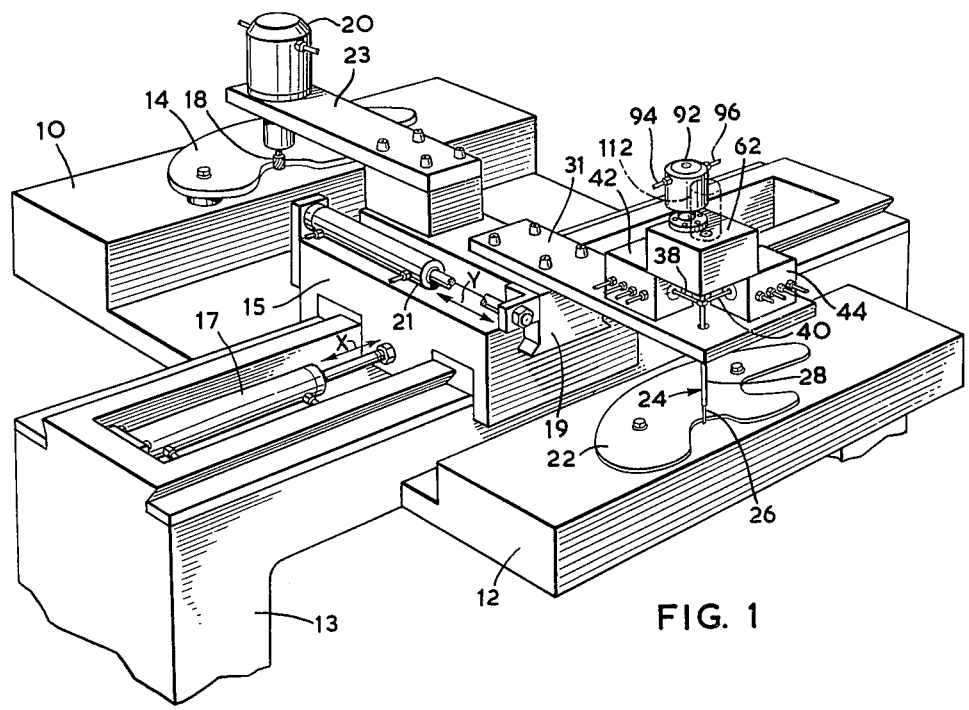

July 26, 1966   L. S. MAGOR   3,262,370
CONTROL SYSTEM

Filed Aug. 19, 1964   3 Sheets-Sheet 1

LINCOLN S. MAGOR
INVENTOR.

BY *R. L. Westell*

PATENT AGENT

July 26, 1966  L. S. MAGOR  3,262,370
CONTROL SYSTEM
Filed Aug. 19, 1964  3 Sheets-Sheet 2
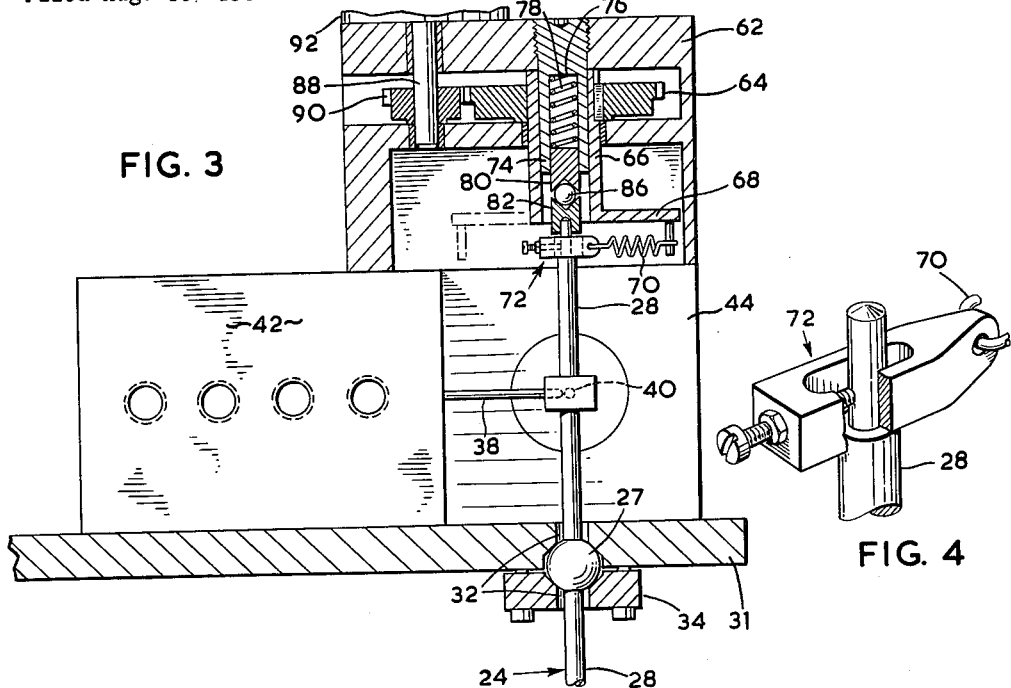
FIG. 3
FIG. 4
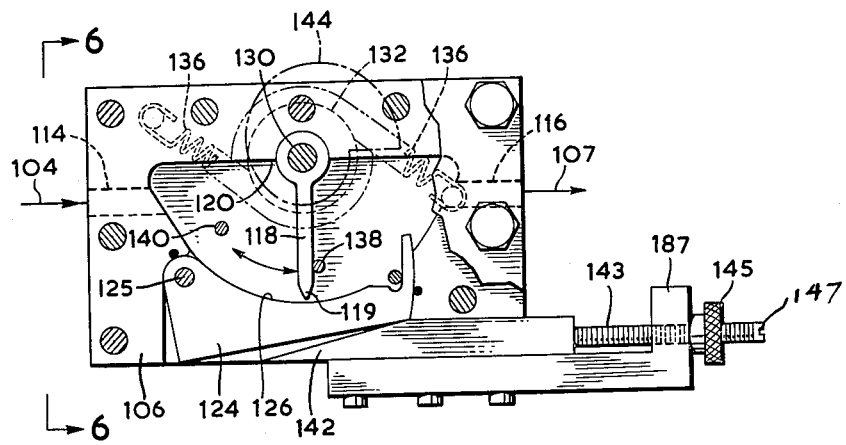
FIG. 5
LINCOLN S. MAGOR
INVENTOR.
BY~ R. L. Westell
PATENT AGENT

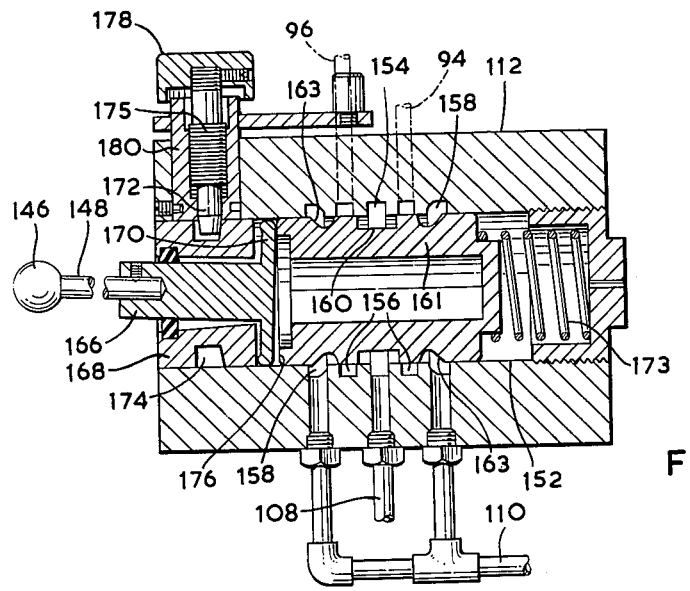
FIG. 6
FIG. 7
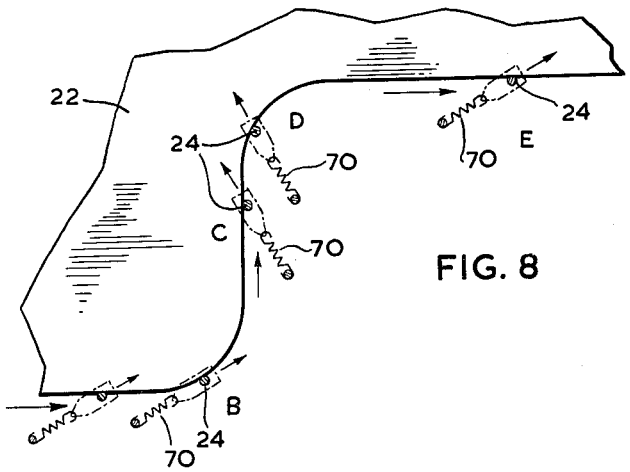
FIG. 8
LINCOLN S. MAGOR
INVENTOR.
BY~ R. L. Westell
PATENT AGENT

United States Patent Office 3,262,370
Patented July 26, 1966

3,262,370
CONTROL SYSTEM
Lincoln S. Magor, Galt, Ontario, Canada, assignor to Retor Developments Limited, Ontario, Canada, a corporation of Canada
Filed Aug. 19, 1964, Ser. No. 390,631
8 Claims. (Cl. 90—13.5)

This invention relates to a control system of most probable use with machine tools and to a control device operable by fluid pressure suitable for use therewith.

It is an object of this invention to provide means allowing a machine tool to trace completely about the perimeter of a pattern.

It is an object of this invention to provide a hydraulic control system which, in contrast to previous systems of the same type, is fully automatic, and requires no guidance of the stylus by the operator.

It is an object of this invention to provide a control means for attachment to a machine tool, wherein the relative movements of a tool and workpiece are connected to correspond to the relative movements of a pattern and tracer, and wherein a sensing device, usually a stylus, forming part of said tracer, controls such relative movement in two directions in accord with its deflection, said sensing device being biased by an orientable biasing means and deflectable against said bias by the pattern. Means are provided for obtaining a physical value which is a measure of the amount of deflection of the sensing device for a neutral position. The device is so designed that when such deflection exceeds a predetermined amount, the stylus has been deflected by the bias rather than the workpiece, and means are provided to rotate said biasing means in one direction, the result of such rotation being that said stylus is redirected relatively toward the pattern, and the tool is correspondingly redirected relatively toward the workpiece. When the said deflection is less than said predetermined amount, the stylus has been deflected against the bias by the pattern, and the rotation means rotate said bias in the opposite direction which will act to redirect the stylus along the direction of the pattern, and the tool along the desired contour to be cut in the workpiece. In the result when the stylus is following a convex radius or curve, the bias tends to continually increase deflection which causes the bias rotation means to turn in the general direction of the contours, or towards the pattern. When tracing a concave radius or curve the pattern opposes the bias and reduces deflection, causing the bias rotating means to again follow the general direction of the curve, but in this instance, away from the pattern.

It is an object of this invention to provide an hydraulic flow measuring device wherein an hydraulic flow sensing element sometimes called a flow sensor herein is provided, deflectable in accord with the amount of flow therethrough, and control means are provided related to said device, operable in accord with the deflection of said sensing element.

It is an object of this invention to provide a device as claimed in the preceding paragraph connected to deflect in accord with the hydraulic flow from a pair of hydraulically activated devices, where such devices control movement of a body in perpendicular directions.

Such hydraulic devices may be either hydraulic motors or hydraulic cylinders or any hydraulically motivated device wherein a pair of hydraulic lines carry fluid to and from the device and the movement of the device in one or the opposite direction is determined by which of the lines is at that time connected as a supply and which as a return line.

Figure 2:
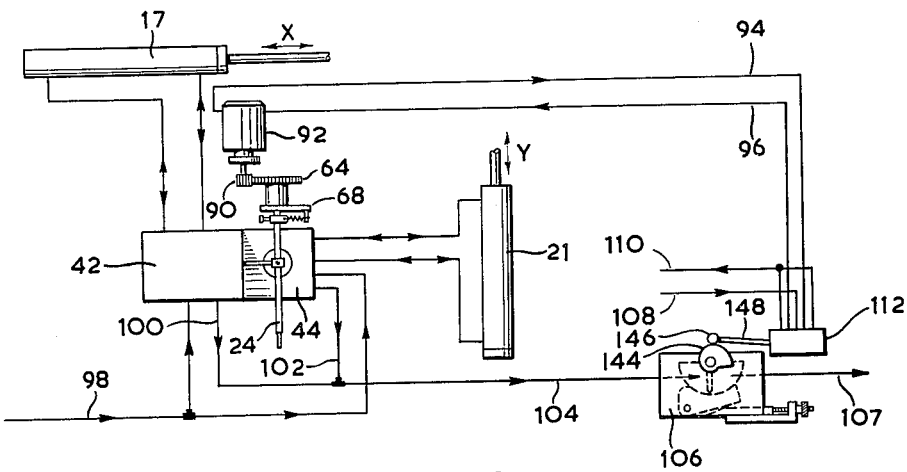

In drawings which illustrate a preferred embodiment of the invention;

FIGURE 1 illustrates a view of the mechanical arrangement of the system;
FIGURE 2 illustrates the hydraulic arrangement of the system;
FIGURE 3 illustrates the biasing, and biasing orientation control in the tracer;
FIGURE 4 illustrates a detail of the biasing system;
FIGURE 5 illustrates the control for the biasing means;
FIGURE 6 illustrates another view of the control for the biasing means;
FIGURE 7 illustrates a valve used in the control for the biasing means;
FIGURE 8 is a schematic indication of the operation of the device.

In the drawings;

Mounted on a platform 10 is a workpiece blank 14 which is to be operated upon by a cutting tool 18 moving relative thereto, while platform 12 mounts a pattern 22 around the full periphery of which will relatively move a tracing element, preferably a stylus 24. The cutting tool is mounted to be driven by motor 20 which rests on arm 23 which is mounted on carriage 19.

In any form of the invention the relative movement between the cutting tool and workpiece corresponds to relative movement between the pattern and the stylus 24. In the form of the invention shown, in FIGURES 1 to 8, the pattern and workpiece are stationary while the tool and stylus move together. It will be realized that the same results can be achieved if the stylus and tool are stationary while the pattern and workpiece move together. Further the pattern and the tool, on the one hand, could move relative to the stylus and the workpiece, on the other hand, but in this event, the tool would produce on the workpiece a mirror image of the pattern. However all these alternative means of operation are considered within the scope of the invention and the control means shown will operate equally efficiently with them.

The platforms 10 and 12 are mounted on base 13. Slidably mounted on base 13 to be moved in what will sometimes be referred to as the X direction is a carriage 15 connected to be moved in either sense in the X direction by a piston 17 whose cylinder is connected to the base 13 and whose rod is connected to carriage 15. Slidably mounted on carriage 15 to be moved in what will sometimes be referred to as the Y direction (which is perpendicular to the direction of sliding of carriage 15 on base 13) is a carriage 19 connected to be moved in either sense in the Y direction by a piston 21 whose cylinder is connected to carriage 15 and whose rod is connected to carriage 19. Thus by a proper combination of relative movement caused by pistons 21 and 17 the carriage 19 may be caused to move in any direction about a 360° range in the plane defined by the directions in which carriages 15 and 19 slide.

It will be noted that the advantages of the invention or its scope are not affected if the pistons 21 and 17 are replaced by hydraulic motors.

The stylus 24 is provided with a sensing tip 26, a shank 28 and a spherical enlargement 27 remote from the sensing tip 26. A mounting plate 31 is supported on carriage 19 and on the lower surface of plate 31 is removably mounted a block 34. The plate 31 and block 34 contain an aligned passage 32 therethrough, large enough to receive the shank 28 passing therethrough with sufficient clearance for deflection of the stylus 24 as hereinafter described.

The facing surfaces of the plate 31 and block 34 define a cavity which has the shape of a surface of revolution dimensioned to slidably contact the spherical enlargement 27 of the stylus shank 28 along circles above and below the widest circle of the sphere 27, such circles of control being measured on a plane perpendicular to the longitudinal axis of the shank. It will be appreciated that the function of the type of stylus mounting shown is to allow universal movement of the shank 28 in a conical locus centered about the axis of passage 32. The passageway 32 above and below the cavity is therefore preferably cylindrically shaped and sufficiently larger than the shank 28 to allow it to move through the desired cone of movement.

It will be obvious that the cavity described, acts simply as a universal mounting for the shank 28 and that different and/or more elaborate universal mountings may be used if desired.

Above the spherical enlargement, flexible, but self-sustaining rods 38 and 40 extend, in directions substantially perpendicular to each other and to the median position of the axis of the shank 28, to the operating spools of a pair of two way valves 42 and 44.

The design of the two valves 42 and 44 is the same and these are of conventional and well known design. Each valve comprises a sleeve and a relatively axiable movable spool therein, and in the embodiment shown, the sleeves are both mounted on the plate 31 while the spools are moveable through rods 38 and 40 with the stylus.

The operation of valve 44 controlling movement through piston 17 of carriage 15 in the X direction; and the operation of valve 42 controlling movement through piston 21 of carriage 19 in the Y direction is in accord with well known valve design. The sleeve of valve 44 receives supply fluid and on movement of the valve spool in one direction sends such supply fluid to one end of cylinder 17 to move the carriages 15 and 19 in one sense in the X direction; and on movement of the valve spool in the other direction sends such supply fluid to the other end of cylinder 17 to move the carriages in the opposite sense in the X direction. The return fluid from cylinder 17 is simultaneously sent by the valve to a return line therefrom. The sleeve of valve 42 similarly receives supply fluid and has a return line, and depending on the deflection of the valve spool from a median position, the fluid is used to move carriage 19 in one or the other relative direction.

In FIGURE 3 is shown means for biasing the stylus 24 in a plane defined by the median position of the shank 28 thereof and this comprises a control housing 62 mounted on the plate 31 and rotatably mounting in a suitable cavity therefor a gear 64 concentrically located over the neutral axis of the stylus 24. Rotatable with the gear 64 is a hollow tube 66 extending downwardly from the housing 62 toward the stylus. Adjacent the stylus a radial arm 68 extends outwardly from tube 66 to mount one end of a tension spring 70 which extends radially inward therefrom with its inner end attached to the upper end of the stylus shank 28 whereby the stylus 24 when unaffected by the pattern bearing on the stylus tip 26 will be deflected in the plane defined by the direction in which the spring 70 extends from the shank 28 and by the median position of shank 28. Means 72 are schematically shown for adjusting the spring 70 tension, but it will be appreciated that such tension may be limited in any manner desired.

A tube 74 closed at one end at 76 extends downwardly in casing 62 to form the rotatable mounting for tube 66. The upper end 76 of the tube 74 forms a bearing shoulder for the upper end of a compression spring 78 which bears at its lower end on a plug 80 slidable in the tube 74, the lower end of plug 80 being provided with a downwardly facing conical cavity corresponding to an adjacent upwardly facing conical cavity formed in a cylinder 82 on the upper end of the stylus shank 28. The two cavities are located, and the parts forming them are dimensioned, so that a ball 86 is retained in the cavities, limiting the deflection of the shank 28 under the bias supplied by spring 70.

The casing 62 also rotatably mounts a shaft 88 extending upwardly out of the casing and there is mounted to rotate thereon, a gear 90 meshing with the spring bias orientation gear 64. Mounted on the housing 62 is an hydraulic motor 92, having a pair of hydraulic lines 94 and 96 thereto, the hydraulic motor 92 being of the type wherein the choice of one of the lines 94 or 96 as the supply line, and the other as the return line, determines the sense of rotation of the motor 92, and hence through the gear drive 90–64 the direction of re-orientation of re-direction of the biasing to the stylus 24 as applied by the biassing spring 70. The control of these lines 94 and 96 is supplied by a flow sensing means in the hydraulic system, to be described in describing the hydraulic system as a whole.

The hydraulic system comprises a supply 98 to the sleeves of the spool valves 44 and 42 for the X and Y cylinders 17 and 21. The return lines 100 and 102 from the spool valves 42 and 44 are joined to form line 104 and the return line 104 is supplied to a flow sensing device 106 and through the flow sensing device 106 along line 107 to a sump. Supply and return lines 108 and 110 for carrying hydraulic fluid from a supply and to a sump respectively go to a valve 112 controlled by the flow sensing device 106. The output lines of valve 112 are 94 and 96 connected to the opposite ends of the hydraulic motor 92.

The flow sensor 106 comprises a casing defining a chamber which in turn defines a fluid flow path therethrough, and at each end of such path a fluid port is provided whereby oil from the line 104 is connected to the inlet port 114, while the outlet port 116 is connected by line 107 to a sump (not shown). Swingably preferably pivotally mounted on the flow sensor casing is vane 118 designed preferably to have a very close sliding fit with the side walls of the chamber. The wall 120 of the chamber joining the side walls adjacent the swingable mounting is shaped to make a close sliding fit with the vane 118 during the swingable movement thereof.

A major portion of the wall defining the side of the fluid path facing wall 120 is provided by a block 124 adjustably connected to the remainder of the casing preferably by pivot pin 125 at the upstream end of the fluid flow path and block 124 has a surface 126 facing and defining one boundary of the chamber shaped to be closely spaced from the end 119 of the vane 118 which is remote from the swingable mounting, during the movement of vane end 119 through its range of swingable movement thereabout. The vane 118 is spring biased toward the upstream direction whereby its deflection varies as the rate of fluid flow through the sensor. In the preferred embodiment such bias is provided by rotatably mounting the vane 118 on a shaft 130 which projects from the casing, such shaft having a pair of sheaves 132 with circularly shaped grooves, in each of these grooves 134 is provided a tension spring 136 connected at one end to the sheave and at the other end to the casing. The length of each spring 136 is sufficient that within the range of movement of the vane 118, a part of the spring 136 is in contact with the respective root of its respective groove, whereby the restive force or bias provided by the spring is acting about a constant radius from shaft 130. In the device, the limits of movement of the vane are set by stop pins 138 (high flow) and 140 (low or substantially zero flow). The sensitivity of the sensor is determined by the spacing of the curved surface 126 of block 124 from the free end 119 of the vane 118. The adjustment may be made in any one of a number of well known ways, but in the preferred embodiment a wedge 142 slidable on the casing in a direction parallel to the fluid flow direction is arranged to move below block 124 to limit its movement to varying (adjustable) distances away from the vane. Such adjustment may be performed in any of a large number of ways but in the preferred embodiment is adjustable by means of a threaded shank 143 on which wedge 142 is mounted and wherein the location of the threaded shank is adjustable by application of a screwdriver to groove 147 which causes the shank 143 to move relative to ears 187 mounted on the casing and through which shank 143 is threaded. Nut 145 also threaded on shank 143 may be tightened against ears 187 when the desired setting has been achieved locking the shank in the desired position. When the sensor is adjusted for less sensitivity, no means need be provided to cause the block 124 to follow the position of the wedge 142, since on retraction of the wedge 142, the oil pressure on surface 126 will move the block 124 out to contact the wedge 142 about pivot point 125.

For maximum sensitivity, the surface 126 is curved to give a narrow sliding fit when closest to the vane 118. Thus the response will be most nearly linear at this maximum sensitivity adjustment and slightly nonlinear at less sensitive settings since the curvature of surface 126 will only be parallel to the locus of the free end 119 at the finest setting; however, in view of the mode of operation which utilizes deflection of the vane 118, over or under a predetermined amount, the nonlinearity of the operation does not render ineffective the operation of the device.

Mounted on the shaft 130 of the vane, externally of the casing, is a cam 144 and the length of the cam radius from the shaft 130 is shaped to increase at a given location with the rotation of the vane 118 in the full flow direction. In the preferred embodiment, rotation of the vane 118 toward full flow position, increases the radius of the cam 144 and rotation of the vane 118 away from the full flow position decreases the radius. Connected to ride on the cam is the sensing element 146 of a shank 148 which projects into valve 112.

Valve 112 (shown in FIGURE 7) is a spool valve, constructed somewhat similarly to the X and Y valves discussed but valve 112 is used in a somewhat unconventional manner. The sleeve 152 of valve 112 has five grooves extending about the inner surface thereof and symmetrically distributed in relation to each other along its axial length. The central groove 154 is a supply groove connected to a hydraulic supply line 108 from a source not shown. The groove 154 is connectable to one of the two adjacent sleeve grooves 156 by movement of the central groove 160 in the spool 161. The two outer sleeve grooves 158 are return grooves connected by line 110 to a sump line not shown. The spool 161 has three grooves axially symmetrically located therealong with the outside grooves 163 dimensioned to connect one or the other of grooves 156 to the sump line 110 simultaneously with the connection of the other groove 156 to central groove 154 through central spool groove 160. The grooves 156 are respectively connected to lines 94 and 96 to rotate the motor 92 in one or the other direction depending on which groove 156 is connected to the supply line 108.

The spool and sleeve grooves are designed so that there is no connection of the supply line 108 to either line 94 or 96 in the median position of the spool 161, i.e. in this position the supply line groove 154 is unconnected to either groove 156 by spool groove 160 with the latter in the median position.

The shank 148 is fixed in a shank 166 projecting into one end of main valve bore 152 which shank 166 in turn is mounted with a small clearance in the bore of a sleeve 168 slidable in the valve bore 152. The clearance between the inner bore of sleeve 168 and the outer surface of the shank 166 (much exaggerated in the drawings) allows relative tilting between the axes of the shank 166 and the bore in sleeve 152, which tilting as hereinafter described, is used to operate the valve. The shank 166 projecting through the sleeve 168 toward the spool 161 is provided with a plate 170 facing shoulders 176 on the spool 161 and the spool 161 with these shoulders is biased against the plate 170 by compression spring 173 bearing at one end on a plate at the end of the bore 152 remote from the shank 148 and at the other end on the spool 161. Shoulders 176 on the side of the spool 161 facing plate 170 form a bearing surface in a plane perpendicular to the spool axis, and the plate 170 under control of the shank 148, is designed in one position to have its surface facing shoulders 176 in a parallel orientation, and it will be seen that the spool 161 will be moved by the spring 173, farthest in the direction of the shank 148 when the shoulders 176, and the facing surface of plate 170, are parallel. The relative positions of spool 170 and shank 148, in this position, will be arranged to correspond to the position of the cam 144 during minimum flow past vane 118, and adjustment for this purpose is achieved by a conical tapered end on stud 172 projecting radially into an exterior peripheral groove 174 in sleeve 168 which groove 174 is slightly wider than the conical end of stud 172. The stud 172 is mounted on the end of a threaded shank 175 controlled by knob 178 and the shank is threadably mounted (eccentrically) in a cylindrical sleeve 180 which is rotatably slidably mounted in the valve casing. The axial location of the plate 170 in its position parallel to shoulders 176 may therefore be set under the bias of spring 173 by the adjustment of the sleeve 180, through a control handle, moving the stud 172 in axial directions (relative to the axis of spool 161) causing consequent movement of the sleeve 168 which forms the fulcrum for plate 170 and hence the valve spool 161.

Fine adjustment is achieved by adjustment of the threaded shank 175 through knob 178 which adjusts in and out and varies the diameter of that part of the stud 172 which contacts the sleeve 168.

The spool 161 is set, by the above adjustments, so that at the vane 118 position corresponding to minimum (or no) flow (against stop 140) the radially smallest part of the cam 144 is in contact with the sensing knob 146 on the shank 148. (It will be noticed that the sensing knob 146 on the shank 148 is biased into contact with the cam 144 by the pressure of spring 173 on plate 170 tending to maintain shank 148 projecting out from the valve 112 in alignment with the axis of spool 161, subject to the deflection of shank 148 by cam 144.) However more positive biasing means may be provided to bias the sensing element 146 into contact with the cam 144 if desired.

The stud 172 is adjusted so that with plate 170 perpendicular to the spool axis the spool 161 is located on the side of the shank 148 a sufficient distance from the median position of the spool, so that under the movement of the cam 144 the variance of plate 170 from the position perpendicular to the valve axis, is sufficient, through the pressure on shoulders 176, to place the spool 161 in the median, or neutral position when the cam 144 reaches its median orientation on deflection of the vane 118 to the median position between stops 140 and 138 by the predetermined desired flow rate of oil through the chamber; and on deflection of element 146 by the cam 144 to a valve greater than this amount, to place the spool 161 beyond the median or neutral position of the valve (in the direction away from shank 148). The location of spool 161 on one side or the other of the median position is effective therefore to connect supply fluid from line 108 to one or the other of lines 94 or 96 whereby the motor is actuated to rotate stylus biasing arm 68 (and hence the bias) in one or the other directions; and the location of spool 161 in the median position, is effective to shut off supply fluid from both lines 96 or 94, leaving the stylus arm 68 stationary during this period. If the general travel of the stylus about the pattern is to be counterclockwise, then the lines 96 and 94 are connected in such a way that the positioning of spool 161 beyond the median position (by high flow through sensor 120) causes the motor 92 to rotate in a direction to move the bias supplied by spring 70 in a counterclockwise direction; while the positioning of spool 161 on the other side of the median position (by low flow through sensor 106) causes the motor 92 to rotate in a direction to move the bias supplied by spring 70 in a clockwise direction. If it is desired that the stylus travel about the pattern in an overall clockwise direction then the lines 94 and 96 may be reversed in their connections so that high and low flows through sensor 106 have effects on the rotation of the bias direction which are the opposite of those described.

*Operation*

In operation, the pattern 22 is firmly mounted on table 12, and the workpiece on table 14; the stylus 24 is set in contact with the pattern 22 and the tool 18 in contact with the workpiece 14. The orientation of stylus 24, biasing arm 68 and spring 70, will be adjusted so that the angle of bias of the stylus 24 will be between 20 and 40 degrees inwardly (i.e. counterclockwise in the direction of motion) relative to the tangent to the pattern 22 at point of contact therewith, the angle being measured from the tangent to biasing direction in the sense in which it is desired that the stylus 24 travel around the pattern; herein let it be assumed that this is counterclockwise.

The connection between the supply and return lines 108 and 110 on the one hand, and the lines 94 and 96 to the bias orientation motor on the other, are arranged so that on movement of the spool 161 in response to movement of the cam 144 to the low flow position, the spool 161 will connect the lines 94 and 96 to the hydraulic motor 92 in the sense to rotate it in the necessary direction to move the biasing arm 68 clockwise; and on movement of the cam 144 to the high flow position as determined by vane 118, the spool 161 will connect the lines 94 and 96 to the motor 92 in the sense to rotate it in the necessary direction to move the biasing arm 68 counterclockwise; i.e. in the direction of overall desired movement around the pattern.

The flow sensor sensitivity, as determined by the spacing between surface 126 and the free end 119 of vane 118 are set so that when the stylus is biased at some angle between 20–40 degrees counterclockwise to the tangent to the pattern at the point of contact, then the flow of oil through the sensor 106 will be at a rate to maintain the vane 118 at a deflection to keep spool 161 at the median position so that no flow takes place in lines 94 and 96 to hydraulic motor 92.

The spool 161 is set to be in the neutral or median position at the desired flow rate by the adjustment of stud 172 or by the setting of the spacing of surface 126 from the free end of vane 118. Set in this way, with the hydraulic supplies operating, the stylus 24 will tend to follow a straight line path along the pattern since no flow will be taking place in either line 94 or line 96 to rotate motor 92 in either direction, and the tool will cut along a corresponding straight path in the workpiece. Further a deflection of the stylus 24 from the medium (i.e. the desired deflection but which is not zero deflection) position will cause a resultant operation of the X and/or Y valves which will act to cause the stylus 24 with its mounting to move in such a direction that would allow the X and Y valves to return to such median position, and it will be noted that such movement of stylus and mounting will be in the direction of such deflection.

In FIGURE 8 the arrows extending away from spring 70 indicate the direction of deflection of the stylus tip under the bias of spring 70.

When the stylus 24, moving along the pattern 22 reaches a location (B FIGURE 8) where the pattern diverges in a counterclockwise direction therefrom (either because the pattern there curves in a counterclockwise direction or because the table movement has caused the stylus tip to move slightly clockwise relative to the pattern);

The stylus 24 under the bias of spring 70 will then deflect from the median position in the direction of the arrow operating one or both of valves 42 or 44 and hence overall flow in the then existing senses of X and/or Y travel is increased. Such increase beyond the predetermined desired amount increases one or both of the return flows to sensor 106 deflecting the cam 144 and shank 148 causing the plate 170 and spool 161 to be moved out of the designed median position. This moves spool 161 to so connect the lines 94 and 96 to the lines 108 and 110 to cause rotation of the hydraulic motor 92 in a direction to alter the orientation of arm 68 and spring 70 counterclockwise, altering the tilt of the stylus in this direction and causing the workpiece and pattern table to move under the control by the stylus of the X and Y valves, so that stylus and tool move relatively (to pattern and workpiece) in a counterclockwise direction and this co-ordinated movement of the orientation arm 70 and of the table continue until the stylus is deflected back to the predetermined angle (as in location C) by the pattern meeting the stylus at an angle of approach within the desired range.

When the travelling stylus tip tends to diverge counterclockwise from the pattern direction (location D) or the pattern diverges clockwise from the stylus (in both cases causing the stylus to encounter the pattern at a more nearly perpendicular angle), or if in the operation described in the previous sentence, the stylus strikes the pattern at greater than the design angular range, then the stylus is moved by the pattern against the bias of spring 70 decreasing the then existing flow in the X and/or Y directions and hence, the flow in the lines 100 and 102 to the sensor 106 is reduced below the predetermined amount. The resultant rotation of cam 144 because of the resultant movement of vane 118 against the flow causes shank 148 to rotate the plate 170 to an orientation more nearly perpendicular to the axis of spool 161, to allow the spool 161 to move beyond the median position in the direction of shank 148 connecting the lines 94 and 96 to the lines 108 and 110 in such a way to cause the motor 92 to rotate in a direction to rotate the biasing spring 70 in a clockwise direction followed by consequent relative clockwise movement of stylus and tool caused by the stylus-controlled X and Y valves until the bias of stylus 24 by spring 70 is sufficiently increased to call for the workpiece table to move in a direction which will move the stylus in a clockwise direction relative to the pattern with corresponding operation and movement of the tool relative to the workpiece and to return the approach of the stylus to an approach angle (as in position E) to the stylus, within the desired range.

It will be realized that if such clockwise rotation is sufficient that the angle of the stylus 24 tends to approach the workpiece at an angle clockwise of the desired angular range then the spring will bias the stylus (due to the absence of resistance of the pattern) sufficiently to cause the flow through sensor 106 to increase beyond the predetermined amount causing (through flow sensor 106 and the movement of spool 161 affecting the rotation of motor 92) counterclockwise rotation tending to return the approach angle of stylus 24 to the pattern at an angle within the desired range.

As described above, the co-ordination of the well known X and Y control by the stylus and the resultant movement of the workpiece table, together with the rotation of the bearing spring 70 under control of the flow sensor which acts on the sum of the absolute values of the flows in the X and Y lines will cause the tool under the control of the stylus to progress completely 360 degrees (in a mean counterclockwise direction) about a pattern and to follow variations and deviations of the pattern as and when called for.

It will be noted that for a designed predetermined flow, that if such flow results from movement of one only of the X or Y hydraulically activated devices (the other not being called for by the stylus) the travel of the tool and stylus, on the one hand relative to the workpiece and pattern on the other hand will be faster than if the flow is caused by the resultant of movement of both actuators. Thus the approach angle will not be constant as the stylus progresses about the workpiece, but rather varies depending on the extent to which movement is primarily in one of the X or Y directions rather than in an intermediate direction. However this variance has not affected the accurate operation of the device; and it will be noted that, if desired, individual flow sensing means could be placed in each of the X and Y return lines 100 and 102 replacing sensor 106 in line 104 and the absolute values of the measured flows in lines 100 and 102 could be resolved trigonometrically by a mechanical linkage to produce a resultant effect which activates spool 161 in accord with the true relative speed of tool and workpiece. This refinement has not so far been found necessary.

Also it will be noted that the sensitivity of the X and Y valves to movements of stylus 24 under the biasing spring 70 must be carefully adjusted to the response of the flow sensor 106 and the hydraulic motor 92 that the stylus 24 and tool 18 cannot get (in any relative counterclockwise deviation therefrom by the pattern) so far spaced that the counterclockwise relative curve of return of the stylus to the pattern will miss the pattern.

Although the travel of stylus and tool is spoken of as varying widely on each side of the pattern (the desired direction) it will be understood that the sensitivity of the device may be constructed so that the variations do not affect the contour of the product beyond the desired range of tolerance.

It will also be realized that the principles and means and modes of operation of the invention are equally applicable if the stylus and tool are stationary and the workpiece and pattern are (together) moved relatively thereto, and this is therefore considered within the scope of the invention.

It is also considered within the scope of the invention if the workpiece and stylus, on the one hand, move relative to the pattern and tool on the other hand, in which event, it will be noted, the tool will cut in the workpiece a mirror image of the pattern.

I claim:

1. In a control for hydraulically operated machines wherein the relative movements between a tool and a workpiece correspond to relative movement between a tracer and a pattern to be reproduced;
   a first valve connected to control relative movement of tool and workpiece in one direction;
   a second valve connected to control relative movement of tool and workpiece in a direction perpendicular to said one direction;
   a stylus mounted to form the operative part of said tracer and arranged to contact and be deflected by said pattern;
   said stylus being connected so that when deflected, said first and second valves are controlled to the extent necessary to produce relative movement in said two directions such that the resultant relative movement of said stylus relative to said pattern is in the direction of said deflection;
   means rotatably mounted for biasing said stylus in a predetermined direction, relative to said means;
   an orientation control for said biasing means;
   means for summing said relative movements in said two directions; and in response to said sum exceeding a predetermined amount, for rotating said orientation control in one direction;
   and in response to said sum being less than a predetermined amount, rotating said orientation control in the opposite direction.

2. In a control for hydraulically operated machines wherein the relative movements between a tool and a workpiece correspond to relative movement between a tracer and a pattern to be reproduced, comprising;
   means connected to control relative movement of tool and workpiece in one direction;
   means connected to control relative movement of tool and workpiece in a perpendicular direction;
   a stylus mounted to form the operative part of said tracer and arranged to contact and be deflected by said pattern;
   said stylus being connected so that when deflected, said first and second control means are controlled to the extent necessary to produce relative movement in said two directions such that the resultant relative movement of said stylus relative to said pattern is in the direction of said deflection;
   means rotatably mounted on said tracer head for biasing said stylus in a predetermined direction, relative to said means;
   an orientation control for said biasing means;
   means for summing said relative movements in said two directions;
   and in response to said sum exceeding a predetermined amount, for rotating said orientation control in one direction;
   and in response to said sum being less than a predetermined amount, rotating said orientation control in the opposite direction.

3. In a control for hydraulically operated machines wherein the relative movements between a tool and a workpiece correspond to relative movement between a tracer and a pattern to be reproduced, comprising:
   hydraulically actuated means connected to control relative movement of tool and workpiece in one direction in accord with the amount and direction of hydraulic flow through said hydraulically actuated means;
   hydraulically actuated means connected to control relative movement of tool and workpiece in a perpendicular direction in accord with the amount and direction of hydraulic flow therethrough;
   means forming the operative part of said tracer to contact and be deflected by said pattern;
   said operative part being connected so that when deflected, said first and second valves are controlled to the extent necessary to produce relative movement in said two directions such that the resultant relative movement (of said operative part relative to said pattern) is in the direction of said deflection;
   means rotatably mounted on said tracer head for biasing said operative part in a predetermined direction, relative to said means;
   an orientation control for said biasing means;
   means for detecting the speeds of such relative movement in said two directions and determining the sum of functions of said speeds;
   and in response to said sum exceeding a predetermined amount, actuatable to rotate said orientation control in one direction;
   and in response to said sum being less than a predetermined amount, actuable to rotate said orientation control in the other direction.

4. Control means for hydraulically operated machines of the type where connections cause the relative movements between a tool and a workpiece to correspond to relative movement between a tracer and a pattern to be reproduced, comprising:
   an hydraulically actuable device connected to control such relative movement in one direction, means for supplying hydraulic fluid to such device and for receiving hydraulic fluid therefrom;
   an hydraulically actuable device connected to control such relative movement in a direction perpendicular thereto; means for supplying hydraulic fluid to such device and for receiving hydraulic fluid therefrom;
   an operative part of said tracer arranged to contact and be deflected by such pattern;
   means rotatably mounted on said tracer head for biasing said operative part in a predetermined direction relative to said means, said operative part being arranged to control in accord with the direction of said deflection measured in the plane of relative movement of said tool and workpiece, the connection of supply and return lines to said hydraulically actuable devices in such manner that such relative movements are in a resultant direction causing the tracer to move in the deflection direction relative to said pattern;

means for combining the return flow from said hydraulically actuated devices;

an orientation control for said biasing means;

means for measuring the said combined flow and in response to said combined flow exceeding a predetermined amount actuable to rotate said orientation control in one direction;

and in response to said combined flow being less than a predetermined amount rotating said orientation control in the opposite direction.

5. In a control for hydraulically operated machines wherein the relative movements between a tool and a workpiece correspond to relative movement between a tracer and a pattern to be reproduced, comprising:

a first valve connected to control relative movement of tool and workpiece in one direction;

a second valve connected to control relative movement of tool and workpiece in a direction perpendicular to said one direction;

a stylus mounted to form the operative part of said tracer and arranged to contact and be deflected by said pattern;

said stylus being connected so that when deflected, said first and second valves are controlled to the extent necessary to produce relative movement in said two directions such that the resultant relative movement of said stylus relative to said pattern is in the direction of said deflection;

means rotatably mounted on said tracer head for biasing said stylus in a predetermined direction, relative to said means;

orientation control for said biasing means;

means responsive to the amount of deflection of such stylus from a neutral position operable in response to such deflection exceeding a predetermined amount for rotating said orientation control in one direction;

and in response to said deflection being less than a predetermined amount rotating said orientation control in the opposite direction.

6. In a control for hydraulically operated machines wherein the relative movements between a tool and a workpiece correspond to relative movement between a tracer and a pattern to be reproduced, comprising:

means connected to control relative movement of tool and workpiece in one direction;

means connected to control relative movement of tool and workpiece in a perpendicular direction;

a stylus mounted to form the operative part of said tracer and arranged to contact and be deflected by said pattern;

said stylus being connected so that when deflected, said first and second control means are controlled to the extend necessary to produce relative movement in said two directions such that the resultant relative movement of said stylus relative to said pattern is in the direction of said deflection;

means rotatably mounted on said tracer head for biasing said stylus in a predetermined direction, relative to said means;

an orientation control for said biasing means;

means for measuring the amount of deflection of said stylus from a neutral position;

and operable in response to said deflection exceeding a predetermined amount to rotate said orientation control in one direction;

and operable in response to said deflection being less than a predetermined amount to rotate said orientation control in the opposite direction.

7. In a control for hydraulically operated machines wherein the relative movements between a tool and a workpiece correspond to relative movement between a tracer and a pattern to be reproduced, comprising:

hydraulically actuated means connected to control relative movement of tool and workpiece in one direction in accord with the amount and direction of hydraulic flow through said hydraulically actuated means;

hydraulically actuated means connected to control relative movement of tool and workpiece in a perpendicular direction in accord with the amount and direction of hydraulic flow therethrough;

means forming the operative part of said tracer to contact and be deflected by said pattern;

said operative part being connected so that when deflected, said first and second valves are controlled to the extent necessary to produce relative movement in said two directions such that the resultant movement of said stylus relative to said pattern is in the direction of said deflection;

means rotatably mounted on said tracer head for biasing said operative part in a predetermined direction, relative to said means;

an orientation control for said biasing means;

means for detecting the amount of deflection of such operative part;

and operable in response to said deflection exceeding a predetermined amount to rotate orientation control in one direction;

and operable in response to said deflection being less than a predetermined amount operable to rotate said orientation control in the other direction;

8. Control means for hydraulically operated machines of the type where connections cause a relative movement between a tool and a workpiece to correspond to relative movement between the tracer and the pattern to be reproduced, comprising:

an hydraulically actuable device connected to control such relative movement in one direction, means for supplying hydraulic fluid to such device and for receiving hydraulic fluid therefrom;

an hydraulically actuable device connected to control such relative movement in a direction perpendicular to said one direction;

means for supplying hydraulic fluid to such device and for receiving hydraulic fluid therefrom;

an operative part of said tracer arranged to contact and be deflected by such pattern;

means rotatably mounted on said tracer head for biasing said operative part in a predetermined direction relative to said means, said operative part being arranged to control in accord with the direction of said deflection measured in the plane of relative movement of said tool and workpiece the connection of supply and return lines to said hydraulically actuable devices in such manner that such relative movements are in a resultant direction, causing the tracer to move in the deflection direction relative to said pattern;

means for measuring the deflection of said operative part; and an orientation control for said biasing means, operable on said deflection of said operative part exceeding a predetermined amount for rotating said biasing means in one direction;

means operative on deflection of said operative part to less than a predetermined amount for rotating said orientation control in the opposite direction.

References Cited by the Examiner

UNITED STATES PATENTS

| | | | |
|---|---|---|---|
| 1,673,831 | 6/1928 | Kuehne | 137—527 |
| 2,741,952 | 4/1956 | Roehm | 90—13.5 |
| 2,788,718 | 4/1957 | Martellotti | 90—13.5 |
| 2,873,606 | 2/1959 | Ekstrom | 73—228 |

WILLIAM W. DYER, JR., *Primary Examiner.*

GERALD A. DOST, *Assistant Examiner.*